United States Patent [19]

Stade et al.

[11] 3,964,773

[45] *June 22, 1976

[54] ANTI-EMISSION EXHAUST PIPE JOINT AND CLAMP THEREFOR

[75] Inventors: Bertil Stade, Wood Dale; Edward Hoglund, Park Ridge, both of Ill.

[73] Assignee: Mercury Metal Products, Inc., Schaumburg, Ill.

[ * ] Notice: The portion of the term of this patent subsequent to Jan. 29, 1991, has been disclaimed.

[22] Filed: Sept. 13, 1974

[21] Appl. No.: 505,749

[52] U.S. Cl. ............................. 285/367; 285/411
[51] Int. Cl.² ...................................... F16L 21/06
[58] Field of Search .......... 285/367, 366, 365, 364, 285/411, 410, 409, 408, 407, 373, 112, 197; 24/284, 279, 273, 270, 201 A, 132 LS, 135 K, 249 LS, 249 LL, 249 SL, 248 SL; 16/171, 172

[56] References Cited
UNITED STATES PATENTS

| 847,620 | 3/1907 | Thompson | 24/284 |
|---|---|---|---|
| 1,205,926 | 11/1916 | Palmer et al. | 24/284 X |
| 1,509,022 | 9/1924 | Noble | 24/249 LS |
| 1,928,316 | 9/1933 | Muto | 285/373 |
| 2,269,664 | 1/1942 | Hallerberg | 285/367 X |
| 2,271,425 | 1/1942 | Harris | 285/367 |
| 3,006,663 | 10/1961 | Bowne | 285/373 X |
| 3,471,176 | 10/1969 | Gilchrist | 285/373 X |
| 3,788,677 | 1/1974 | Stade et al. | 285/367 |
| 3,865,413 | 2/1975 | Mizusawa et al. | 285/367 |

FOREIGN PATENTS OR APPLICATIONS

| 108,514 | 12/1967 | Denmark | 285/365 |
|---|---|---|---|
| 83,650 | 10/1964 | France | 285/410 |
| 1,400,577 | 4/1965 | France | 24/248 SL |
| 1,019,322 | 2/1966 | United Kingdom | 285/367 |
| 966,992 | 8/1964 | United Kingdom | 24/284 |

Primary Examiner—Thomas F. Callaghan
Attorney, Agent, or Firm—Silverman & Cass, Ltd.

[57] ABSTRACT

A joint which is made up of exhaust pipes formed with beaded ends or with a beaded end on one pipe and a flared end on the other pipe, in any case either with or without suitable gasket means. A clamp having a concave groove engages the protrusions on the ends of the pipes of the joint and wedgingly forces them together as the clamp is constricted.

The clamp is made out of two halves which are hingedly connected at the first end of each and which are adapted to be secured by a bolt at the second end of each, there preferably being a nut permanently welded to one of the second ends coaxial with a first perforation in that end and a second perforation in the other of the second ends to pass the bolt to the nut. The hinged connection is preferably non-separable.

16 Claims, 14 Drawing Figures

ANTI-EMISSION EXHAUST PIPE JOINT AND CLAMP THEREFOR

BACKGROUND OF THE INVENTION

The invention herein relates to exhaust pipe joints and clamps therefor, the principal purpose of the invention being to provide a joint and clamp which will reduce if not eliminate emission from exhaust system joints.

The basic principles of the invention and the general background therefor will be found in U.S. Pat. No. 3,788,677. The invention herein is intended as an improvement and/or variation of the invention disclosed in said patent. The improvement relates to the convenience of handling the clamp of the prior patent by virtue of certain structural changes made thereto. The variation relates to a slightly different form of end bead formed on one of the exhaust pipes.

With respect to handling of the clamp, in the use thereof the prior disclosure showed the forming of the clamp in two pieces or halves. There was a rectangular bight formed on the first end of one half and a simple flat tongue formed on the first end of the other half, the tongue lying in the bight and being centered and held against movement because the two halves were held in axial alignment on the joint. The concave grooves of the halves engaged the abutted beads and could not move laterally of one another. Although this is efficient and economical, the workman being required to assemble the clamp onto a joint has to handle two separate members. The invention herein contemplates an articulated connection which is as efficient but in which the two halves are preferably permanently coupled to one another as a part of the manufacturing process so that the workman in assembling the joint need not handle two separate pieces.

In addition to solving the problem of handling two halves of the clamp, the use of a bolt and nut for fastening the second ends together posed requirements again of handling a pair of members (bolt and nut) in addition to manipulating the two halves of the body of the clamp. Also in tightening the bolt and nut, one has to be twisted and the other held. The invention herein contemplates permanently securing the nut to the second end of one half so that all the workman need do is to thread the bolt into the nut and tighten the bolt.

With respect to different forms of the beads on the ends of the pipes, the clamp of the patent as well as that herein is of a construction which will permit the application of an axial force of one pipe against the other to tighten their engagement if one end is provided with a round bead and the other end is provided with a flared bead—sort of a male and female connection. This form of joint is capable of being maintained substantially emission-free even if the pipes are not perfectly aligned, and one of the forms of the invention herein proposes a clamp structure which allows for substantial misalignment.

The clamp features of the invention herein are applicable to structures not necessarily consisting of pipe joints and the invention is considered broad enough to cover clamps per se using such features.

With respect to prior art known by the applicants, that which is of record in the patent referred to is believed typical.

SUMMARY OF THE INVENTION

A joint for exhaust pipes in which the pipes are provided on each end with rolled ends butted face to face and presenting a pair of circumferential ring-like beads side by side to the pipe clamp. The beads may both be arcuate in cross section or one may be flared. The pipe clamp for the joint has a pair of bands or halves which are arcuate in cross section connected together with the concave portions of the halves engaging over the side by side beads. Taking up on the clamp constricts the same and wedgingly forces the pipe ends axially toward one another. A gasket may be interposed between abutting beads.

The pipe clamp of the invention is formed of a pair of semi-circular halves, the central body portion of each half being arcuate in cross section to provide a radially inwardly facing concave formation to straddle and engage the side by side beads. The first ends of each half are articulatedly connected together. They are provided with cooperating slot and tongue means and preferably the tongue portion of the means has an enlarged end which prevents its being withdrawn from the slot portion of the means after assembly so that the two halves are secured together and can be handled easier than if they were separate parts. The second ends of each half are provided with generally radially outwardly bent tabs, one of which has a right angle bend to present a flange edge to the inner face of the other to prevent distortion during tightening and thereby enable application of constricting force mainly close to the pipe. The tabs have aligned perforations to receive a machine bolt loosely therethrough, one tab having a nut welded on its outside aligned with its perforation so that the workman assembling the clamp onto a workpiece need only insert the bolt through the perforations into engagement with the nut and tighten the same.

DESCRIPTION OF THE PREFERRED EMBODIMENTS

Figure 1:
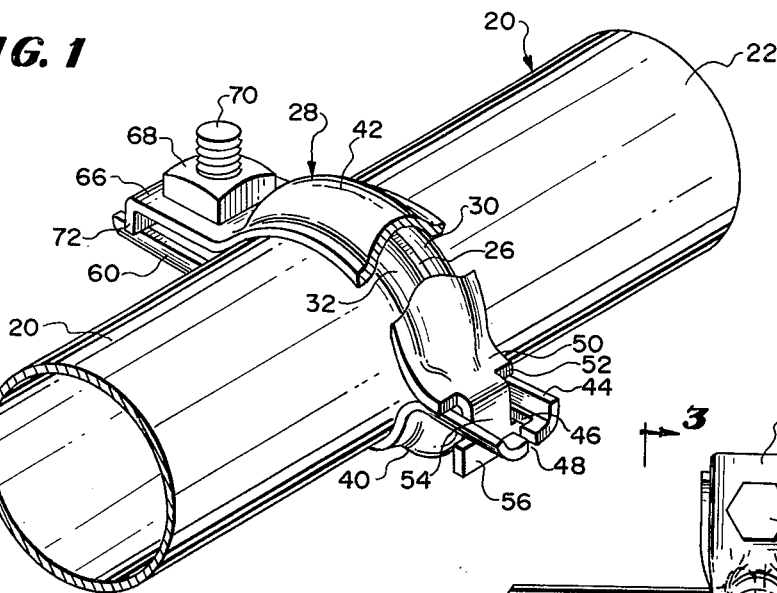
FIG. 1 is a perspective view with portions broken away showing the joint of the invention and a pipe clamp constructed in accordance with the invention.
Figure 2:
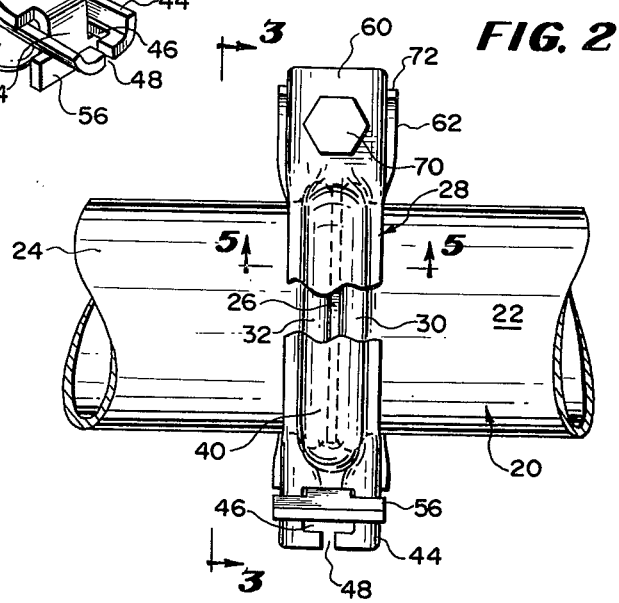
FIG. 2 is a bottom plan view of the same with portions broken away.
Figure 3:
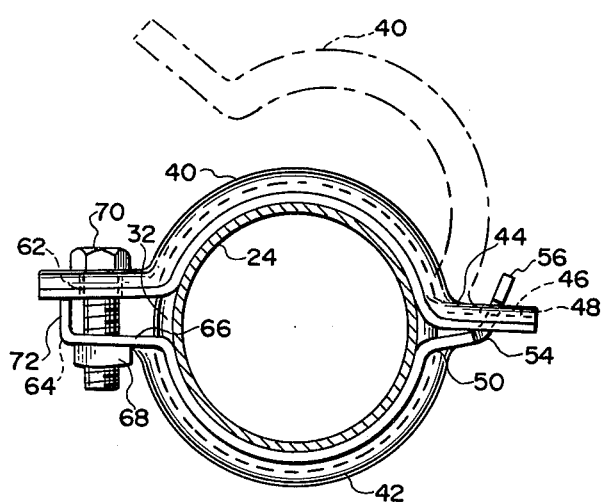
FIG. 3 is a sectional view taken generally along the line 3—3 of FIG. 2 and in the indicated direction.
Figure 4:
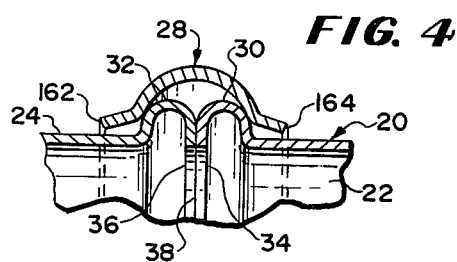
FIGS. 4 and 5 are fragmentary sectional views taken generally along the line 4—4 of FIG. 2 and in the direction indicated, the joint including a gasket in one view and not in the other.
Figure 5:
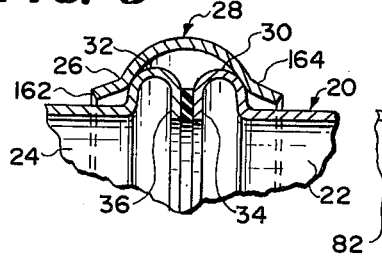

The reference character 20 designates generally a joint which is made up of two pipes 22 and 24 comprising parts of an exhaust system, intended to be connected together in a tight, substantially emission-free connection either with or without a gasket 26 sandwiched therebetween. The pipe clamp which is to be utilized to force the ends of the pipes together is designated generally 28.

With respect to the joint 20 and the pipes 22 and 24, their construction in FIGS. 1 through 5 is no different from the simplest form of joint disclosed in the above-mentioned patent. Their ends are rolled to form the ringlike bead formations which are called beads 30 and 32. These beads 30 and 32 are arcuate or rounded in cross section and their axially facing surfaces comprise annular flanges 34 and 36 which tightly abut to form the contact juncture 38 in case there is no gasket 26; or which press tightly against the opposite faces of the ring-like gasket 26 in case one is used.

As mentioned in the said patent, the gasket is used where the metal from which the pipes are fabricated is tough, such as for example, stainless steel. Stainless steel does not work easily to produce perfect beads, making it difficult to provide a perfect contact juncture 38. Actually, such gasket 26 is advisable in most vehicles where the exhaust system is put together on a production line basis and/or the vehicle will be subject to substantial vibration.

The clamp 28 differs from the clamp of the patent in the construction of the ends of the halves of the clamp. As in the patent, the clamp 28 is formed separately of two parts or halves 40 and 42, each of which is generally semicircular in configuration and each of which has generally radially outwardly extending ends. The medial portion of each half is formed with an arcuate cross section providing a convex ridge aspect radially outward and a concave groove aspect radially inward. When the halves are assembled onto the joint 20, the concave grooves of the halves 40 and 42 align to provide an annular concave formation that engages upon the outside of the beads around the majority of the circumferences of the beads 30 and 32. As the clamp is constricted, the interior surfaces forming the concave grooves wedge the beads towards one another thereby forcing the pipes axially into engagement with one another.

The ends of the halves 40 and 42 are bent radially outwardly, as explained. The first end 44 of the half 40 is formed in a channel-like configuration and has a rectangular perforation 46 therein which opens to the edge of the end 44 by way of a narrow slot 48. The first end 50 of the opposite half 40 is bent radially outwardly also, but is cut away as shown at 52 in FIG. 1, to form a necked tongue 54 that is bent at an angle relative to the end 50 towards the end 44, passing through the perforation 46 and having an integral enlarged cross-head 56 overlying the convex side of the end 50. The assembly of the tongue 54 into the perforation 46 requires that the slot 48 be spread apart to admit the necked tongue 54 and then forced back together to prevent removal of the tongue 54 without damaging the end 44.

Looking for the moment at the connection just described, one can understand that the two halves are articulatedly connected together substantially permanently thereby. In the broken line portion of FIG. 3 one can see how the two halves 40 and 42 can pivot relative to one another to enable the clamp 28 to be engaged upon the joint 20. In considering the force which is applied to the connection when the clamp is constricted on the joint, the compression of the opposite ends of the clamp (shortly to be described) will tend to cause the first ends 50 and 44 to separate. The tongue 54 will be placed in tension which is easily resisted by the robust steel from which the clamp will be made. For example, for a typical two inch outer diameter pipe joint, the clamp will be stamped from ⅛th inch cold rolled sheet steel so that the tongue 54 at its narrowest section will be ⅛ inches thick and about ⅜ inches wide. The cross-head 56 has a vertical dimension of about ¼ inch so that in order to tear it off one would have to shear two such sections.

The channel configuration of the portion 44 resists deformation and also is quite robust notwithstanding the decrease in cross section occasioned by the perforation 46.

The second end 60 of the half 40 is also radially outwardly bent and has a channel configuration similar to that of the end 44. A central perforation 62 is aligned with a similar perforation 64 provided in the second end 66 of the half 42. There is a nut 68 which is welded to the outside surface (bottom as viewed in FIG. 3) of the end 66 with its threaded opening axially aligned with the perforations 62 and 64. A threaded bolt 70 is engaged through the perforations and threaded onto the nut 68. Taking up on the bolt 70 forces the ends 60 and 66 together. The end 66 has a right angle bent flange 72 whose free edge engages against the inside of the second end 60 to cause the constricting force to be transferred closer to the joint 20 after the edge of flange 72 has been brought into engagement with the end 60. This prevents distortion of the ends 60 and 66 during the taking up of the clamp.

Figure 6:
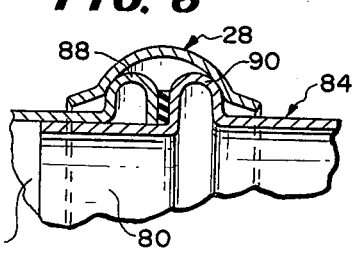
FIGS. 6 and 7 are views similar to those of FIGS. 4 and 5 but showing modified forms of the invention.

When the clamp 28 is furnished to a workman engaged in assembling the same onto a joint 20, it comprises an integral device formed of the articulated halves 40 and 42. The workman applies the halves onto the assembled joint 20, reaches for a single bolt 70, inserts the bolt into the perforations with its end engaging the nut 68 and tightens the bolt. He has handled only two items, in addition to the joint which usually would be held in a fixture or some kind or maintained in position in some other manner. For example, the joint may comprise pipes 80 and 82 as shown in FIG. 6 in which case their telescoping together will hold them in assembly to an extent sufficient to permit the mounting of the clamp 28.

The pipes 80 and 82 form the joint 84 either with or without the gasket 86. The pipe 82 has a bead 88 formed like the pipe 24 and the bead 32, but the pipe 80 has a piloting section 80 so that the bead 90 is formed spaced from the pipe end. Details of various piloting arrangements are also disclosed in the above mentioned patent. Such arrangements are applicable as well to the invention herein.

FIGS. 8, 9, 10 and 11 illustrate a joint and pipe clamp constructed in accordance with the invention in which the pipes making up the joint may be somewhat misaligned without causing emission leakage. In the case of the joint of FIG. 1, without a gasket the joint and clamp combination operates best when the pipes 22 and 24 are in perfect coaxial alignment. With a gasket a slight amount of misalignment may be tolerated, but when misalignment exceeds a degree or so, problems may be encountered. The structure of FIGS. 8 through 11 permits a misalignment of the order of 3° without loss of sealing.

The clamp 100 is constructed exactly like the clamp 28 exept that the medial sections of the halves 102 and 104 are deliberately made narrower as indicated at 106 and 108 than normally would be expected. Thus, the ends 110, 112, 114 and 116 have a width dimension which is indicated by the double-ended arrow 118, or at least this dimension is the width of the strip of steel from which the clamp halves and hence the ends would be formed as by stamping. As for the medial sections 106 and 108, the portions which would normally constitute their skirts are cut away, the shoulders resulting from such decrease in width being indicated at 120, 122, 124 and 126 in FIG. 9. Thus, the narrower medial sections have a width dimension indicated by the double-ended arrow 128. In the clamp 28, the dimensions 118 and 128 are substantially the same.

Figure 10:
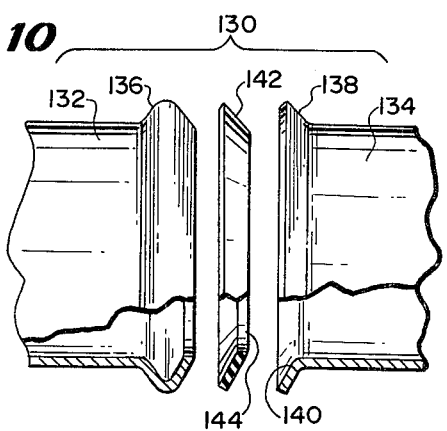
FIG. 10 is an exploded fragmentary view of the joint which is intended to be assembled with the clamp of FIGS. 8 and 9.
Figure 9:
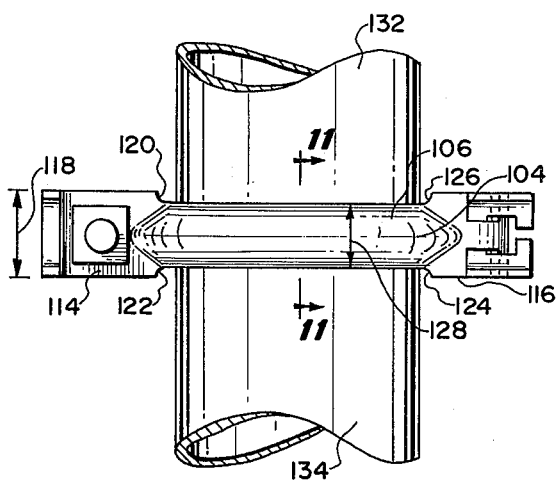
FIG. 9 is a bottom plan view of the joint of FIG. 8.
Figure 11:
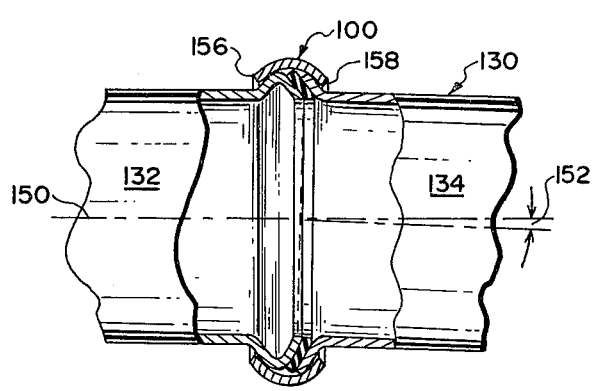
FIG. 11 is a sectional view through the joint of FIG. 9 taken generally along the line 11—11 and in the direction indicated.

The removal of the skirts enables the clamp 100 to clear the pipes forming the joint when these pipes are misaligned. In FIG. 10 it is seen that the joint 130 comprises the pipes 132 and 134, each having a rolled bead formed on its end. The bead or beaded formation 136 is of arcuate cross section quite similar to the beads 30 and 32 of the clamp and joint of FIGS. 1 through 5 but the beaded formation 138 is outwardly flared giving rise to a sort of conical flange having an interior conical surface 140. A conical gasket 142 is used with this joint, the gasket 142 having a central opening 144. When engaged to form the joint 130, the inner conical surface 140 of the flange-like beaded formation 138 and the conforming gasket 142 ride on the exterior of the outwardly convex rounded surface of the bead 136 in a generally circular contact. This type of contact will be maintained for substantial misalignment of the pipes 132 and 134 as demonstrated in FIG. 11, which shows the variance from alignment of the center lines 150 and 152 of the respective pipes. The engaged surface of bead 136 may be considered a flange contacting the abutted flange 138 on the interior thereof.

Again as in the previous instance, the taking up of the clamp 100 forces the two pipes 132 and 134 axially against one another compressing the intervening gasket and sealing the joint 130. The canting of the clamp 100 when there is misalignment has no effect on the efficiency of the resulting assembly because the clamp skirts do not come into engagement with the pipes. For purposes of definition, the shortened skirts of the clamp 100 are indicated at 156 and 158. The normal skirts of the clamp 28 are indicated at 160 and 162 in FIG. 4.

Figure 7:
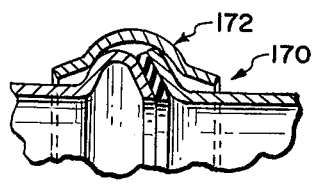
Figure 8:
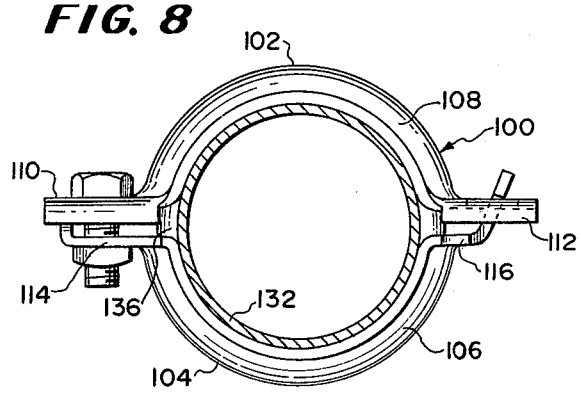
FIG. 8 is a view similar to that of FIG. 3 but showing a form of the invention in which the clamp is especially intended for use with a joint that may become misaligned during assembly.

In FIG. 7 there is illustrated a joint 170 similar to the joint 130 maintained in assembly by the clamp 172, which in this case is similar in construction to the clamp 28.

Figure 12:
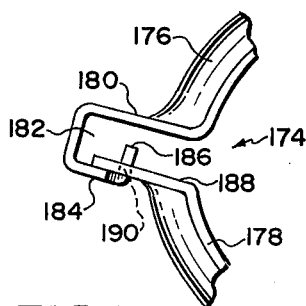
FIG. 12 is a fragmentary side elevational view of one end clamp of modified form.
Figure 13:
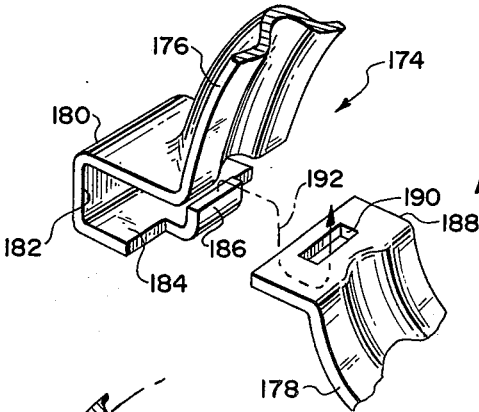
FIG. 13 is an exploded fragmentary perspective view of the clamp of FIG. 12 illustrating generally the manner in which it is assembled.
Figure 14:
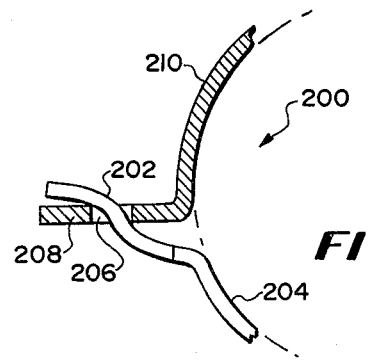
FIG. 14 is a view similar to that of FIG. 12 but showing still another form of the invention.

FIGS. 12 to 14 illustrate the articulated cooperating connections on the first ends of the halves of clamps of modified form. In both cases, the connection is also articulated as in those embodiments previously described and illustrated, but these connections may be disassembled to separate the halves of the clamps. Such structures would be used where it is not important or necessary to keep the halves of a clamp in permanent articulated assembly.

In FIGS. 12 and 13 the clamp 174 is made up of the halves 176 and 178 which, while advantageously having the medial configuration similar to those of clamps 28 and 100, need not be so formed. Such clamps may be used for purposes other than holding a pipe joint together. For example, these may hold an elastomeric hose to a spud. The first end 180 of the half 176 is shown formed with a generally rectangular bight 182 quite similar to the rectangular bight of the clamps of the above mentioned patent, but the lower flange 184 of the bight 182 has a central inwardly directed tongue 186 integral therewith and bent at a right angle thereto. The first end 188 of the half 178 is a simple radially extending tab or blade intended to engage in the bight 182 and overlie the flange 184 in the type of connection which is described in said above mentioned patent. There is a central slot or perforation 190 punched into this tab 188 that is engaged onto the tongue 186 when the halves 176 and 178 are assembled prior to their being engaged onto the pipes or hose with which they will be assembled. This is done in a simple movement indicated by the line 192 of FIG. 13. In this manner the clamp 174 is handled more readily since it retains its alignment while engaging it upon the workpiece to which it will be assembled. It is easily disassembled if desired. The fact that no mechanical operation is needed to effect its assembly as in the case of the clamps 28 and 100 (requiring the opening and subsequent closing of the slot 48 to enable insertion and mounting of the necked tongue 54) means that it may be somewhat more economical to manufacture.

The remaining clamp 200 of FIG. 14 has a simple reverse curve projection 202 formed at the end of the half 204 entering the slot 206 and forming an articulated connection with the tab 208 in which the slot is punched. The tab is formed on the first end of the half 210.

In every case, the clamps are made out of two halves which are fabricated separately and then assembled.

Considerable variations can be made in the clamps and the joints without departing from the spirit or scope of the invention as defined in the appended claims. The invention is considered to be the clamp structure and the combination of clamp structure with joints.

What it is desired to secure by Letters Patent of the United States is:

1. A clamped joint comprising:
   A. a pair of pipes, each pipe having a rolled end forming a beaded formation directly thereon at an axial end thereof, said beaded formations including respectively axially facing flange surfaces and the flange surfaces being engaged in abutment on at least respective circular contact areas substantially coaxial with the pipes to dispose said beaded formations parallel and side by side,
   B. a pipe clamp formed of two generally semicircular halves each formed of a single piece of metal and having a semicircular medial portion and two ends extending respectively generally radially outwardly from the medial portions so that when the halves are mated to form a loop of the medial portions the juxtaposed ends will be generally parallel to one another at least where they connect with their respective medial portion, C. the medial portion of each half having an arcuate cross section throughout a substantial extent of its circumferential length arranged so that there are radially inwardly facing concave groove means on the interior of each half, the concave groove means straddling and engaging the beaded formations at locations spaced from their contact area to apply wedging forces if the halves are constricted which wedging forces tend to move the beaded formations toward one another to force the flange surfaces tightly into engagement, D. the first ends of each half being arranged on the same circumferential side of the loop resulting when the halves are mated and being generally planar and having cooperating tongue and slot means forming an articulated connection providing limited swinging movement of the halves relative to one another, said limited swinging movement being sufficient to expose the entire medial section, said swinging movement provided generally in a plane normal to the axis of said loop, the tongue means being integral with one first end and bent at an angle relative thereto toward the other first end, the slot means comprising a passageway through the other first end in a portion thereof which is planar and having a wide portion and a narrow portion to an edge of said other first end, the tongue means being engaged into the passageway and having an enlarged end protruding beyond the plane of the said other first end remote from the one first end, said tongue means being dimensioned to prevent withdrawal of said tongue means from said slot means, and E. the second ends of each half being arranged on the circumferential side of said loop diametrically opposite the first ends and being generally planar and having cooperating fastening means to bring said second ends together to constrict said halves on said beaded formations.

2. The clamped joint as claimed in claim 1 in which there there is an annular gasket sandwiched between the respective contact areas.

3. The clamped joint as claimed in claim 1 in which at least one of the beaded formations is generally arcuate in cross section.

4. The clamped joint as claimed in claim 1 in which said beaded formations are arcuate in cross section.

5. The clamped joint as claimed in claim 1 in which one of said beaded formations is arcuate in cross section and the other is flared.

6. The clamped joint as claimed in claim 1 in which the tongue and slot means are separable to permit separation of said halves.

7. The clamped joint as claimed in claim 3 in which there is an annular gasket sandwiched between the respective contact areas.

8. The clamped joint as claimed in claim 5 in which the contact area of the arcuate beaded formation is on its exterior and the contact area of the flared beaded formation is on its interior and there is a conical annular gasket sandwiched between the contact areas.

9. The clamped joint as claimed in claim 1 in which said medial portions include annular integral skirts extending generally parallel with the circumferential surfaces of said pipes, said halves each being formed of an integral strip of metal of substantially uniform width throughout the length thereof, the arcuate cross section part of each medial portion utilizing substantially less than the full width of said strip and the skirts comprising the edges of the strip not utilized by the arcuate cross section part and being bent generally at a substantial angle relative thereto.

10. The clamped joint as claimed in claim 5 in which said medial portions include annular integral skirts extending generally parallel with the circumferential surfaces of said pipes, said halves each being formed of an integral strip of metal of substantially uniform width throughout the length thereof, the arcuate cross section part of each medial portion utilizing substantially less than the full width of said strip and the skirts comprising the edges of the strip not utilized by the arcuate cross section part and being bent generally at a substantial angle relative thereto.

11. The clamped joint as claimed in claim 10 in which the skirts are shortened whereby the medial portions are narrower than said ends.

12. The clamped joint as claimed in claim 1 in which the fastening means include a threaded socket provided on one of said second ends and a threaded bolt passed through a perforation in the other of said second ends and engaging in said socket.

13. The clamped joint as claimed in claim 5 in which the fastening means include a threaded socket provided on one of said second ends and a threaded bolt passed through a perforation in the other of said second ends and engaging in said socket.

14. The clamped joint as claimed in claim 6 in which said slot means is deformable to enable opening said narrow portion for installation of the tongue means in said slot means and thereafter closing same.

15. The clamped joint as claimed in claim 1 in which said other first end is channel-shaped in cross section and the slot means are in the central part thereof.

16. The clamped joint of claim 1 wherein the second ends comprise substantially radially outwardly extending tongues with the tongues spaced apart and having cooperating fastening means for bringing together and securing said tongues, one of said tongues having a right angle bent flange directed toward the other tongue and adapted to limit movement of the tongues toward one another.

* * * * *